United States Patent Office 2,971,726
Patented Feb. 14, 1961

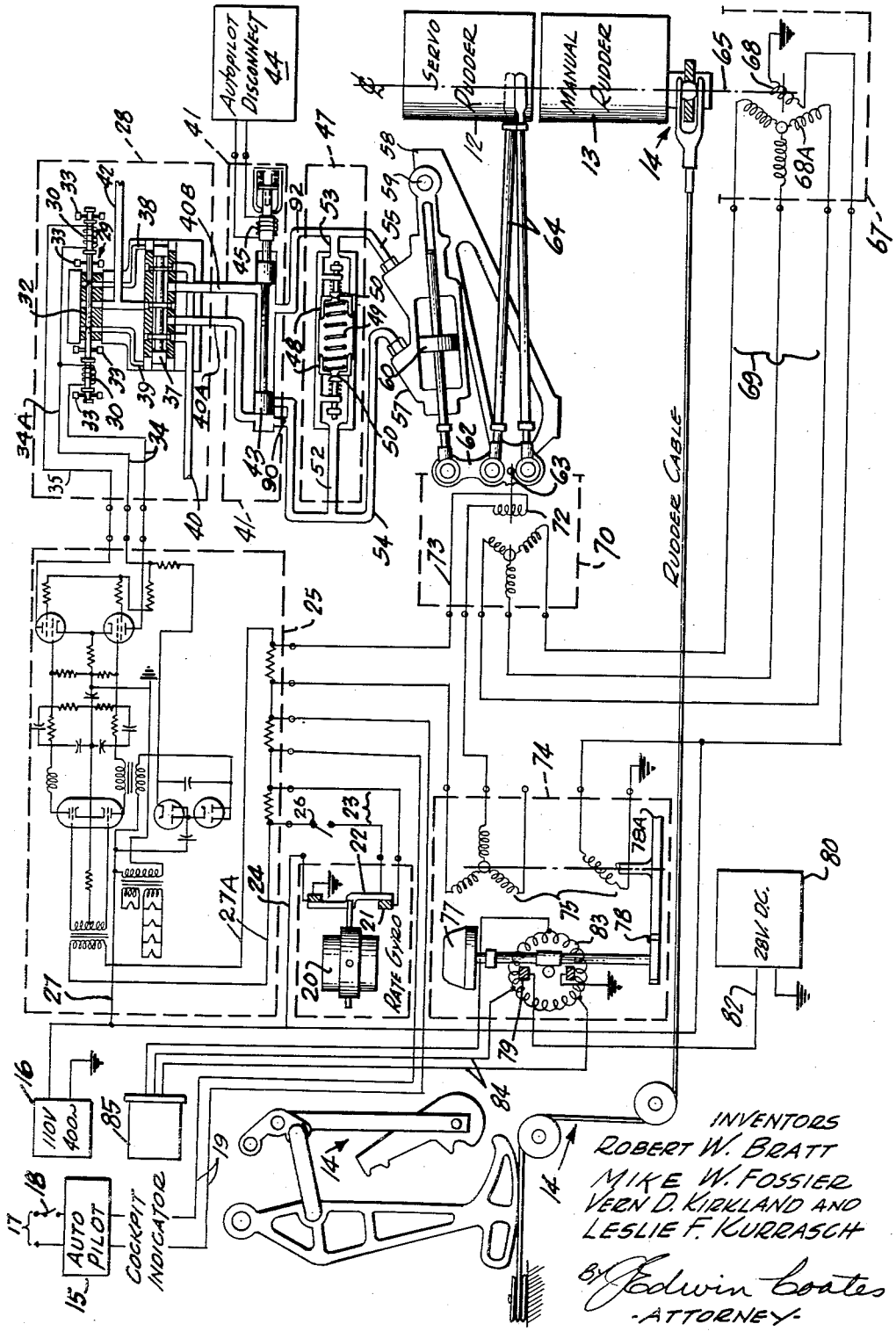

2,971,726
YAW DAMPING SPLIT RUDDER

Robert W. Bratt, 428 Via Linda Vista, Redondo Beach, Calif.; Vern D. Kirkland, 2008 Wendy Way, Manhattan Beach, Calif.; and Leslie F. Kurrasch, 8413 Vicksburg Ave., Los Angeles 45, Calif.; and Mike W. Fossier, Bedford, Mass.

Filed June 6, 1955, Ser. No. 514,672

(Filed under Rule 47(a) and 35 U.S.C. 116)

7 Claims. (Cl. 244—76)

This invention relates to aircraft yaw-damping systems of the type employing a split rudder, that is, a pilot-powered main rudder and an automatically controlled servo rudder mounted coaxially therewith, auto-piloting of the main rudder also being contemplated as incorporated in the same directional-control system.

In current split-rudder yaw damping systems, rather large pedal forces are required to overpower the servo-rudder; also, since in such systems rudder deflection is proportional to rate of yaw and forces are fed back from the rudder to the pedals, the servo rudder also has to be overridden in turns and sideslips. Further, whenever the yaw damper acts, it moves the pedals, somewhat upsetting the "feel" of the controls to the pilot. In case of yaw damper failure, resulting in the servo rudder being "jammed full over" and becoming inoperative, it is nearly impossible to retain or exercise directional control of the craft. Hunting and over-control by contemporaneous split rudder yaw dampers is by no means a rare occurrence.

In most such systems, when for piloting reasons, the normal neutral position of the main rudder has to be altered, the servo rudder does not also adopt this new neutral position but retains its original neutral position, so that it cannot now properly correct or neutralize the yawing of the craft.

Again, although in conventional split rudder yaw damping systems, the pilot is, usually, not required to overcome the yaw damping servo rudder on "easy" turns, he does have to exert more than ordinary pedal force, which is obviously undesirable.

These and other deficiencies in split-rudder yaw dampers are obviated by the present invention which provides a split-rudder yaw-damping system wherein the servo-rudder is automatically controlled by a directional damper or rate-of-yaw gyro and also either independently or concurrently by an autopilot. The respective signals of these two instrumentalities are transmitted, after amplification, to an electro-hydraulic valve which controls a hydromotor for actuating the servo-rudder. The main, or pilot-powered, rudder is of course independent of the servo-rudder and is provided with a position-transmitting "synchro" device which, when the neutral position of the main rudder is altered, indirectly transmits a signal to the amplifier and electro-hydraulic valve and hence, independently of the rate-of-yaw gyro, causes the hydromotor to permanently shift the neutral position of the servo rudder to correspond with the new neutral position of the main rudder, which it maintains until the main rudder again has its neutral position altered.

Means are also provided in conjunction with the servo rudder actuating system, to adjust the position of the servo as a position reference for the main rudder, independently of the rate-of-yaw gyro and autopilot, of course. That is, the servo rudder is temporarily halted in a new reference-position which is not necessarily the true "neutral" position of either the servo rudder or the main rudder, with the yaw damping system quiescent, or, in equilibrium. This confers a sort of "position-sense" upon the servo rudder, giving it a new "starting" position which is not necessarily its neutral position.

Further, the autopilot may be effective on the servo rudder for automatic directional control even while the novel yaw-damping system also acts on the servo rudder.

No pedal motion or feed-back of rudder forces from the servo rudder to the pedals is created by the present yaw damping system, the main rudder and the servo being independent of each other, all the servo rudder operating mechanism being independent of the main rudder.

In brief, these and other advantageous results are accomplished by means, including electrical instrumentalities and circuitry, for slaving the servo-rudder to the manual rudder; means for controlling the servo rudder in response to rate-of-yaw gyro signals for symmetric-yaw damping purposes; means for trimming the servo rudder from a cockpit trim actuator in accordance with the particular nose-tendency feel desired by the pilot or to neutralize a unilateral, asymmetric yaw-tendency due to wing-heaviness, thereby to obviate the necessity for employing the ailerons; and means for achieving steering via the servo rudder, if desired, by virtue of provisions for driving the servo rudder in response to signals originating in the autopilot circuits.

One of the manifold configurations, presently contemplated for achieving these and other results and advances is illustrated in the accompanying diagrammatic drawing and is described hereinafter in conjunction with this drawing but only by way of example, since the invention may be embodied in any desired form lying within the scope of the sub-joined claims.

The construction and arrangement of parts shown in the drawing comprises a pilot-powered rudder, or main rudder 13 and a servo rudder, or automatic yaw damping rudder 12, the two being given a common axis of independent rotation by means of a common rudder post, 65.

Rudder 13 is actuated by means of the conventional pilot-powered mechanical controls 14 which, as usual, include rudder pedals, and links for tensioning cables running over pulleys to opposite sides of a rudder bar or horns extending laterally from the rudder post, the servo rudder not responding to these actuating forces. The servo rudder, is, instead, automatically actuated to apply yaw-neutralizing forces as by means later described.

An autopilot system is provided and includes a conventional autopilot 15, an energizing circuit 17 including a selector, or "on-off" switch 18 and a conductor-path 19 from the autopilot 15 to the cancellor circuit of a substantially conventional amplifier 25, later described. As will become apparent, the autopilot is connected to actuate the servo rudder 12, only, having no effect upon the main rudder, 13. The autopilot thus takes over directional control at the will of the pilot and automatically steers and maintains the "nose" of the craft on its due course.

The servo rudder 12 also is actuated automatically by means including a rate-of-yaw gyro 20 to neutralize yawing while also connected to the autopilot and is constrained to then respond at all times to the resultant of the signals imposed on it by the autopilot and by the present novel yaw-damping system that includes a rate-of-yaw gyro 20.

As diagrammatically indicated, the rate-of-yaw gyro unit 20 is of conventional nature and includes, generically, a synchro mechanism conventional to such rate-of-yaw gyros and having stator means 21 connected by a conductor 24 to a 110 volt-400 cycle alternator or other energy source 16, and the rate-gyro also includes rotary means 22 operated by the gyroscope in response to yawing, all in the conventional manner. The one "pole" of the block-means 21 and the one "pole" of the rotor 22 are electrically connected to the proper "input" terminals of amplifier 25, as shown, by means of a conductor path 23, a selector switch 26 being provided in this path to enable cutting in or cutting out the yaw damping system.

The amplifier 25 is in every respect substantially a conventional one, energized from the source 16 by means including a conductor 27 and differing, from conventional only in including a series-adding circuit 27A to accommodate the rate-gyro signals, the autopilot signals, and the servo-rudder differential-and-trim signals.

The essential purpose of the amplifier is to augment the signals from the gyro, the autopilot and the differential and trim synchro 70 (later described) and feed them, in accordance with the aforesaid concept, to means for actuating the servo rudder, these latter means first including an electro-hydraulic valve, 28, for controlling the flow of actuating fluid for the servo rudder, the actuation of which is described hereinafter.

The electro-hydraulic valve 28 is of substantially conventional construction and hence includes electro-magnetic control means, 29, therefor, the control means comprising solenoids 30 mounted coaxially on each end of a piston valve 32 acting as a common "core" of the two solenoids. Four stops 33 are provided as shown to limit the travel of the valve 32, in the usual manner. A conductor 34 leads from the amplifier to the left-hand solenoid, return circuit being made through a common bus 34A, and a conductor 35 leads from the amplifier to the right-hand solenoid, return circuit being made through the bus 34A.

The control means 29 control the reciprocation of a piston-type shuttle valve 37 by virtue of controlling the application alternately to opposite ends of the piston-valve 37 of actuating pressure fluid. To this end, when the right-hand solenoid 30 is energized, it so moves the core 32 that it unblocks the entrance of pressure fluid from the central bore of the control 29 to a conduit 38 that leads to the right-hand end of the piston valve 37, thus applying a displacing pressure to 37 that moves it leftwardly sufficiently to unblock the passage of pressure fluid from the source-conduit 40 to the outlet conduit 40A. When the left-hand solenoid is energized, it so moves the core or valve 32 that it unblocks the entrance of pressure fluid from the central bore of the control 29 to a conduit 39 that leads to the lefthand end, thus applying a displacing pressure to the left hand end of 37 that moves it rightwardly suffciently to unblock the passage of pressure fluid from the source conduit 40 to the outlet conduit 40B. An exhaust conduit system leads pressure fluid constantly to the control 29 from source 40 thru the valve-unit that includes 37, excess being exhausted through the right-hand branch, 42.

A by-pass type of valve 41 is operatively connected to the conduits 40A and 40B to enable the pilot to render inoperable all the controls of the configuration except the pilot-powered ones, such as the main rudder, 13. Unit 41 includes a by-pass valve per se, 43, and a manually activated control switch unit 44 operative upon the valve 43. The latter includes a casing in which the spring-loaded double-headed piston is reciprocatably mounted for movement by a solenoid 45 that is energized to position the heads as shown by closing a switch in panel 44 and deenergized to move the piston-valve 43 leftward to disconnect all controls but the pilot's manual ones.

The outlet conduits 90 and 92 of the by-pass valve are led onwardly to the hydromotor that actuates the servo rudder 12 and all three of these conduits (including the bifurcation of conduit 90) pass pressure fluid onwardly until control 44 is actuated to position the pistons on 43 across the inlets 40A and 40B.

Interposed between conduits 90 and 92 is a pilot's efforts relief valve 47. The purpose of this valve is to limit the efforts exerted by the pilot in directionally controlling the craft in the event that the servo rudder system is damaged and becomes inoperative, with the servo rudder "full over" and stopped. By virtue of the relief valve's presence, the resultant airload on the "stuck" servo rudder raises the pressure on the one side of the hydromotor cylinder, which results in fluid escaping to the one side or the other of the relief valve thus allowing the servo rudder to be blown back by the airstram at least part way toward neutral to a position "faired" with the airstream. When thus faired, it necessitates a smaller effort for the pilot to operate the main rudder himself than if the now inoperative servo were not faired. To this end, the relief-valve of unit 47 includes, generally, a casing containing a pair of opposed cups 48 which are spring separated, ported and movable as shown, the spring 49 normally resisting the equal fluid pressures thru conduits 90 and 92, acting equally on the outer faces of the opposite cups. As shown, the outer, flat face of each cup normally seats against an annular shoulder provided on the inner cylindrical surface or bore of the valve-cylinder. Between these annular shoulders the diameter of this cylinder is less than it is beyond these shoulders. That is, the cylinder is "counter-bored" in its longitudinal-central portion. Hence, the cups can be moved inwardly toward the center of the valve-cylinder, but neither one can be moved outwardly beyond the adjacent shoulder. Consequently, pressure forcing the left cup rightwardly will not force the right cup beyond its depicted position. Instead, this pressure will open both the aforesaid ports. A spring loaded poppet valve 50 is coaxially mounted in each end of the valve casing to normally close the adjacent port in the adjacent cup. However, for example if more fluid is supplied thru conduit 40A than thru conduit 40B, the left-hand cup will be urged away from the adjacent poppet valve unblocking the port in this cup and allowing the higher-pressure fluid to open the right-hand poppet valve and flow thence to join the lower pressure fluid passing through conduit 92, both streams uniting to enter the right-hand side of hydromotor 57 through conduit 55. The reverse action occurs, of course, if the fluid in conduit 40B is of the higher pressure, the combined fluid flows then entering the lefthand of the hydromotor through conduit 54. It will be understood that relief valve 47 functions only when the servo rudder and its cognate system is in the rarely occurring condition known as "rudder full over and jammed." In all other conditions, that is, normally, a pressure differential exists between the conduits 40A and 40B so that, among other desired functionings, the autopilot system can operate the servo rudder. Naturally, in order to prevent the spring-loaded poppet valves 50 from opening to cause relief valve 47 to relieve the pressure differential in conduits 40A and 40B in other than emergency situations, these springs are designed with a predtermined yield-value. This value is such as to keep the poppets closed until, because of the aforementioned abnormal condition or position of the servo-rudder, the pressure in 40A or 40B, as the case may be, builds up to a value exceeding this predetermined spring-yielding value, whereupon the aforestated "emergency" operation of the relief valve 47 occurs.

The hydromotor 57 essentially consists of a double-acting piston and hydraulic cylinder unit pivoted at one end to a fixed arm 58 by means of a pivot 59. The piston rod 60 is, by its free end, pivotally connected to the outer end of a walking beam, 62, the latter being pivotally mounted to arm 58 near its inner end, as by shaft 63. Push-pull rods 64 are pivoted to the walking beam at each side of pivot shaft 63 and lead to opposite horns of the servo rudder 13 in order to apply the gyro-originated and autopilot originated anti-yaw forces properly to this rudder.

Mounted coaxially with the structure-supported shaft 63 is a servo-rudder position transmitter unit 70 including a rotor-stator signal-generating unit, or "synchro," 72 for generating signals in response to the rotation of the shaft, these signals being forwarded to the amplifier's rudder differential and trim input terminals by means of a conductor 73, by means of which the electro-hydraulic valve is operated to so actuate the hydromotor, independently of the rate-of-yaw gyro, as to adjust the position of the servo rudder to constitute a position reference for the main rudder.

A main-rudder position transmitter 67 is mounted coaxially of the rudder post and is constructed and arranged to transmit a signal to the position transmitter 70 and thence to the amplifier to so actuate the electrohydraulic valve and the hydromotor as to shift the neutral position then occupied by the servo rudder 12 to one corresponding to the new neutral position of the main rudder, 13. It is to be understood that the pilot can at will alter the main rudder's neutral position, or the latter may be so altered by the riggers at the outset, as to counteract a torque tending to make the craft's nose tend right or left, off the course. Position transmitter 67 consists of a synchro, or signal generator, having a rotor 68 fixed coaxially to the rudder post and rotative with it, the stator 68A being fixed to structure and consisting, as usual, of a three-phase conductor path 69 series connected to corresponding elements of the stator of position transmitter 70, so as to enable the new neutral position of the rudder post or torque tube to bias the servo rudder 12 correspondingly, by means of a permanent displaced position of the piston in the hydromotor, the signal from synchros 67 and 70 summating algebraically to influence the amplifier to properly actuate the electro-hydraulic valve to the end that the "zero" position of the hydromotor piston be shifted properly to shift the neutral position of the servo rudder.

In order to overcome or neutralize without use of ailerons any tendency of the craft's nose to turn right or left under an unbalanced force that produces an asymmetrical yawing such as a right yaw due to the right wing's being overloaded and therefore "wing-heavy," means are provided and coupled to the servo rudder for positioning the latter at a compensatory angle to the main rudder and maintaining this angular differential. To this end, a servo-rudder trim unit 74 is provided, preferably in the cockpit and includes a synchro 75 the rotor of which is, as shown, energized in parallel with the rotor of synchro 67 by means of the energy source 16. The stator of synchro 75 is connected in series to the rotor of synchro 70 and thence thru amplifier 25 and electro hydraulic valve 28, to actuate the hydromotor 57 connected to the servo-rudder.

A knob type actuator 77 has its shaft terminated downwardly by a spur gear 78, as shown, establishing a driving connection with another gear 78A on the shaft of the rotor of synchro 75, thereby to enable the signal differential emanating from 74 to add to that from synchro 70, be amplified in 25 and actuate the electro-hydraulic valve and the hydromotor and thereby effect angular differential setting of the servo rudder with respect to the main rudder. In order to apprise the pilot as to this setting, a trim indicator system is provided, the system being conventional and including a "selsyn" comprising stator 79 energized by a battery or the like 80 by means of a conductor path 82. The stator is electrically associated with a rotary potentiometer 83 which has a three-wire conductor-path 84 signalling a trim indicator instrument 85 in the cockpit.

In flight, it will be observed that any asymmetrical yaw tendency is neutralized ab initio by the cockpit trim unit setting of the servo-rudder, this setting maintaining a sufficient angular differential between the servo rudder and the longitudinal center line of the craft to obviate such "nose-right" or "nose-left" tendency without use of the main rudder or further actuation of the servo rudder.

Automatic damping of symmetrical yaws, without hunting or overcontrolling of the craft's nose, is effected independently of the main rudder by the rate-of-yaw actuated system 20, 23, 25, 28, 47 and 57.

The system 70, 25, 28, 47 and 57 in flight operates to feed back a position-indicating signal to the system 25, 28, 47 and 57 so as to effect adjustment of the servo-rudder such as to constitute it a position-reference, so to say, for the main rudder, thus conferring a new starting position upon the main rudder. In effect, therefore, this system gives the servo-rudder a position sense with the system then in temporary equilibrium.

As indicated hereinbefore, system 67, 69, 25, 28, 47 and 57 acts whenever the neutral position of the main rudder is altered, and this system gives the servo rudder a new neutral position corresponding to that of the main rudder.

Although hereinabove certain parts or components have been described as specific reference types and with particularity as to their shapes, compositions and natures, it is to be understood that such constitutes no limitation upon the scope of the combination or sub-combination of which they form elements, the nature and ambit of the inventive advances being solely as defined in the appended claims. Many equivalents of the particular elements specified therefore fall within the bounds of the claimed invention.

We claim:

1. A yaw-damping system for aircraft, comprising: a first pilot-powered rudder; a second servo rudder mounted for movements independent of those of the first rudder; mechanical actuator means mechanically connected to the second rudder for actuating same; a source of pressure fluid; electro-hydraulic valve means connected to said source and connected to said actuator means for controlling the latter; yaw-responsive signal-emitting gyroscopic directional damper means operationally connected to said electro-hydraulic valve means so as to actuate the latter and the second rudder counteractively to yawing; an electrical position transmitter arranged to be actuated by movements of the first-rudder; and electrical means connecting said transmitter to the directional damper means and thence to said valve; whereby to effect shifting of said second rudder to a new neutral position in accordance with change of neutral position of the first rudder to a new neutral position, thereby to provide correspondence of the neutral positions of the second-rudder with those of the first rudder with which to enable the system including the second rudder to accurately damp out yawing.

2. A yaw-damping system for aircraft, comprising: a first pilot-powered rudder; a second servo rudder mounted for movements independent of those of the first rudder; means, including a hydromotor, connected to the second rudder for actuating same in directional damping movements; a source of pressure fluid; electro-hydraulic valve means connected to said source and connected to said hydromotor; a rate-of-yaw directional damper gyro operatively connected to said valve means so as to actuate same counteractively to yawing; a synchro-mechanism including a rotor and a stator having its rotor mounted coaxially on the axis of rotation of said first rudder; and a conductor path connecting the stator of said synchro mechanism operatively to the directional damping movements-effecting means and thence to the electro-hydraulic valve, whereby to effect shifting of said second rudder to a new neutral position corresponding to a new neutral position of said first rudder, thereby to enable the system including the second rudder to accurately damp out yawing.

3. A yaw damping system for aircraft, comprising: a first pilot-powered rudder; a second servo rudder mounted for movements independent of those of the first rudder; mechanical means mechanically connected to the second rudder for actuating same; a source of pressure fluid; electro-hydraulic valve means connected to said source and to said actuating means for controlling the latter; yaw-responsive gyroscopic directional damper means operatively connected to said valve means so as to actuate the latter and the second rudder counteractively to yawing; an autopilot also operatively connected to said electro-hydraulic valve means and said second-rudder actuating means so as to actuate said second rudder for automatic directional control; an electrical position-transmitter arranged to be actuated by movements of the first rudder; and electrical means connecting said transmitter to the directional damper means and thence to said valve.

4. A yaw-damping system for aircraft, comprising: a first pilot-powered rudder; a second servo rudder mounted for movements independent of those of the first rudder; mechanical actuator means mechanically connected to the second rudder for actuating same; a source of pressure fluid; electro-hydraulic valve means connected to the source and connected to said actuating means for controlling the latter; yaw-responsive signal-emitting gyroscopic directional damper means operationally connected to said electro-hydraulic valve means so as to actuate the latter and the second rudder counteractively to yawing; an electrical position transmitter arranged to be actuated by movements of the first-rudder; an electrical conductor path extending from said transmitter toward the directional damper means; a second position-transmitter operatively interposed in said conductor path and arranged to be operated by movements of said second rudder; and electrical means operatively connecting said second transmitter to the directional damper means and thence to said electro-hydraulic valve, so as to provide the second rudder with independent position sense.

5. A yaw-damping system for aircraft, comprising: a first pilot-powered rudder; a second servo rudder mounted for movements independent of those of the first rudder; mechanical actuator means mechanically connected to the second rudder for actuating same; a source of pressure fluid; electro-hydraulic valve means connected to the source and connected to said actuating means for controlling the latter; yaw-responsive signal-emitting gyroscopic means operationally connected to said electro-hydraulic valve means so as to actuate the latter and the second rudder counteractively to yawing; means arranged to be actuated responsively by movements of said first rudder; other means arranged to be actuated responsively by the second rudder; means connecting the last two aforesaid means so as to algebraically summate their respective responses; and means for impressing a signal proportional to said summation upon said electro-hydraulic valve.

6. A yaw-damping system for aircraft, comprising: a first pilot-powered rudder; a second servo rudder mounted for movements independent of those of the first rudder; mechanical actuator means mechanically connected to the second rudder for actuating same; a source of pressure fluid; electro-hydraulic valve means connected to the source and connected to said actuating means for controlling the latter; yaw-responsive signal-emitting gyroscopic directional damper means operationally connected to said electro-hydraulic valve means so as to actuate the latter and the second rudder counteractively to yawing; an electrical position transmitter arranged to be actuated by movements of the first-rudder; an electrical conductor path extending from said transmitter toward the directional damper means; a synchro-mechanism including a rotor and a stator and having its rotor arranged to be rotated by movements of said second rudder and having its stator operatively connected in said conductor path; and electrical means connecting said rotor to said directional damper means and thence to said electro-hydraulic valve; whereby to shift the neutral position of the second rudder to correspond with a new neutral position of the main rudder.

7. A yaw damping system for aircraft, comprising: a first pilot-powered rudder; a second servo rudder mounted for movements independent of those of the first rudder; hydraulic actuator means connected to the second rudder for moving the same; yaw-responsive signal-emitting means connected to the actuator for controlling same and moving the second rudder counteractively to yawing; electrical means connected to the first rudder to be operated by same; other electrical means arranged and connected for actuation by the first-said electrical means so as to shift the second rudder to a new neutral corresponding to that of the first rudder.

References Cited in the file of this patent
UNITED STATES PATENTS

| | | |
|---|---|---|
| 2,171,265 | Carlson | Aug. 29, 1939 |
| 2,336,096 | Heintz | Dec. 7, 1943 |